United States Patent [19]

Nishihara et al.

[11] Patent Number: 5,017,231

[45] Date of Patent: * May 21, 1991

[54] PROCESS FOR PREPARING COATED PIGMENTS

[75] Inventors: Akira Nishihara; Makoto Tsunashima, both of Tokyo, Japan

[73] Assignee: Mitsubishi Kinzoku Kabushiki Kaisha, Tokyo, Japan

[*] Notice: The portion of the term of this patent subsequent to Jan. 16, 2007 has been disclaimed.

[21] Appl. No.: 460,642

[22] Filed: Jan. 3, 1990

Related U.S. Application Data

[63] Continuation of Ser. No. 64,245, Jun. 19, 1987, abandoned.

[30] Foreign Application Priority Data

Jun. 20, 1986 [JP] Japan .................. 61-142808
Jun. 20, 1986 [JP] Japan .................. 61-142809
Jun. 20, 1986 [JP] Japan .................. 61-142810

[51] Int. Cl.$^5$ .......................... C09C 1/10; C08J 7/04
[52] U.S. Cl. .......................... 106/452; 106/429; 106/440; 106/447; 106/450; 106/490
[58] Field of Search ............. 106/452, 440, 447, 490, 106/450, 429

[56] References Cited

U.S. PATENT DOCUMENTS

| | | | |
|---|---|---|---|
| 3,905,936 | 9/1975 | Hawthorne | 106/504 |
| 4,275,136 | 6/1981 | Murasawa et al. | 430/117 |
| 4,325,740 | 4/1982 | Jacobson | 106/300 |
| 4,375,373 | 3/1983 | Abe et al. | 106/403 |
| 4,894,092 | 1/1990 | Nishihara et al. | 106/452 |

OTHER PUBLICATIONS

Derwent Abstract, Accession No. 79-32140B/17, Japanese Patent No. J54034332-A, 3/13/79.
Derwent Abstract, Accession No. 71-71308S/45, Japanese Patent No. J46005529-A.
Derwent Abstract, Accession No. 87-225928/32, Japanese Patent No. J62151469-A, 7/6/87.

Primary Examiner—A. Lionel Clingman
Assistant Examiner—Christine A. Skane
Attorney, Agent, or Firm—Oblon, Spivak, McClelland, Maier & Neustadt

[57] ABSTRACT

A heat-resistant pigment can be produced by forming a dense and uniform coating on the surface of the pigment by contacting a hydrophilic pigment with a metal oxide in at least partly water-miscible solvent.

11 Claims, No Drawings

PROCESS FOR PREPARING COATED PIGMENTS

This application is a continuation of application Ser. No. 064,245, filed on June 19, 1987, now abandoned.

FIELD OF THE INVENTION

This invention relates to a process for preparing pigments coated with one or more species of metal oxide and having excellent heat resistance, weatherability, light fastness and chemical stability.

BACKGROUND OF THE INVENTION

Pigments which are inferior in heat resistance, weatherability, light fastness and chemical stability (resistance to acids, alkalis and other chemicals) can be improved by coating the surface thereof with a physically and chemically stable metal oxide or treating the surface thereof with a coupling agent.

For instance, cadmium pigments undergo discoloration when subjected to a temperature 700° C. or higher and their brilliant color is lost, because cadmium sulfide, their principle, is converted to cadmium sulfate or cadmium oxide. Therefore, cadmium pigments cannot be used for products such as ceramic tiles which are subjected to high temperatures.

Of the chromium yellow pigments, the principle of which is lead chromate, and chromium orange are inferior in heat resistance and acid resistance and lemon yellow is inferior in heat resistance and resistance to alkali and they all suffer discoloration. Molybdenum red, which essentially consists of lead chromate and lead molybdate, is inferior in heat resistance, acid resistance, alkali resistance, weatherability and light fastness, and suffers discoloration.

Cadmium yellow (pale light), ultramarine, chromium green, lithopone, Bordeaux-10B, etc. are inferior in acid resistance, and prussian blue, chromium green, brilliant carmine 6B, lake red C, Bordeaux-10B, rhodamine lake Y, etc. are inferior in alkali resistance.

As methods for surface treatment of pigment for the purpose of improving heat resistance, weatherability, light fastness, acid resistance, alkali resistance, etc., the following are known; (a) To form a coating of silica on the surface of pigments by addition of a silicate salt when the pigments are formed by precipitation. (b) To form a coating by adding a metallic salt which forms a water-insoluble metal hydroxide or oxide upon neutralization or a metal salt pair which forms a water-insoluble salt by double decomposition reaction in a dispersion of a pigment. (c) To modify the surface of pigments using a titanium coupler or silane coupler.

In addition to the above, there is known a method for preventing oxidation decomposition of pigments for ceramic tiles comprising mixing a stable material such as zirconium silicate which is not attacked by glaze into a pigment and firing the mixture.

In the methods (a) and (b), precipitate of silica or a water-insoluble metal salt is formed on the surface of pigments. Formation of precipitate is usually influenced by temperature, pH, etc. and adjustment of many factors are required, and yet it is very difficult to form dense and homogeneous coating. The method (c) is effective for improving weatherability, light fastness and dispersibility of pigments. However, the couplers are mere surface-modifiers for pigments and do not form a dense coating on the surface of pigments, and therefore, they are of little use for improving heat resistance, acid resistance, alkali resistance, etc.

When a coating for improving heat resistance, light fastness, acid resistance and alkali resistance of pigment is formed, formation of the coating is usually carried out under the heated condition, since the reactivity is low at room temperature or lower temperatures. By the reaction at an elevated temperature, no dense coating film is formed. The reason is surmised to be that metal hydroxide molecules formed by rapid hydrolysis attach to the already formed suspended metal hydroxide or oxide particles in preference to the surface of pigments, meaning that the percentage of the molecules depositing on the pigment surface is low.

We have found that if a hydrophilic pigment is contacted with a metal alkoxide such as alkyl silicate in an at least partially water-miscible organic solvent, a dense and uniform coating is formed at relatively lower temperatures. Further, we found that if a secondary coating is formed on the thus formed primary coating by repeating the above procedure or by the known precipitation process, a firm coating is formed and heat-resistance, weatherability, light fastness, chemical stability such as acid resistance and alkali resistance, etc. of the pigment is further improved.

DISCLOSURE OF THE INVENTION

This invention provides a process for preparing coated pigments comprising contacting a hydrophilic pigment with a metal alkoxide in an at least partially water-miscible organic solvent to form a coating on the surface of said pigment, and drying and/or firing the thus coated pigment.

The hydrophilic pigments treatable by the process of the present invention include tinting pigments such as cadmium pigments, chromium yellows, iron oxides, ultramarine; body pigments such as titanium dioxide, zinc white, etc.; and many other inorganic pigments as well as organic pigments having hydrophilic groups such as $-NH_2$, $-CN$, $-OH$, $-NHCONH_2$, etc.

The metal alkoxides usable in the process of the present invention are methoxide, ethoxide, n-propoxide, isopropoxide, butoxide of titanium, silicon, zirconium, aluminium, zinc, boron, thorium, beryllium, barium, tin and rare earth metals. Specific examples are silicon alkoxide (alkyl silicate) such as silicon tetramethoxide (methyl silicate), silicon tetraethoxide (ethyl silicate), etc.; zirconium tetraethoxide, zirconium tetrabutoxide, titanium tetra-n-propoxide, titanium tetraisopropoxide, aluminium triethoxide, aluminium triisopropoxide, boron triethoxide, etc. Metal alkoxides condensation-polymerized up to hexamer or so can be used. Two or more alkoxides can be used in combination. By combining alkoxides of different properties, pigments can be provided with enhanced heat resistance, weatherability, light fastness, chemical stability and other characteristics by virtue of composite or synergistic effect.

The solvents usable in the present invention are those which are miscible with metal alkoxides and at least partially miscible with water. Specific examples thereof are methyl alcohol, ethyl alcohol, propyl alcohol, acetone, acetylacetone, ethylene glycol, butyl alcohol, methyl acetate, ethyl acetate, methyl ethyl ketone, methyl isobutyl ketone, etc. The mixing ratio of the metal alkoxide and the solvent is not specifically restricted.

The amount of the hydrated metal oxide formed on the surface of pigments should be preferably at least 0.1 wt. %, more preferably not less than 1.0 wt. % as the metal oxide. When the amount of the metal oxide coating is less than 0.1 wt. %, the surface of the pigment may not be well covered, and heat resistance, weatherability, light fastness and chemical stability of the pigment is apt to be insufficient. When the amount of the metal oxide coating is in excess of 10 wt. %, dispersibility of the pigment may be poor, and use of such pigments in paints and plastics will be restricted. Therefore, a metal alkoxide should be present in the treating solution in an amount of not less than 0.1 wt. % and not more than 10 wt. % as long as paints and plastics are concerned.

Although hydrated metal oxide is formed on the surface of the pigment, the hydrated metal oxide is converted to metal oxide upon drying and/or firing.

In the process of the present invention, it is preferred that the pigment to be treated be soaked in one of the usable solvents for a long period of time (2~20 hours) prior to being contacted with a metal alkoxide. This increases the affinity of the pigment to alkoxide.

It is also preferred that the contacting of pigment and metal alkoxide be conducted at a lower temperature ($-10°$ C.~$10°$ C.) in order to obtain a dense coating. For obtaining a dense coating and shortening the reaction period, it is advantageous to carry out the contacting at a low temperature at least in the initial stage and to raise the reaction temperature (up to $80°$ C.) in a later stage.

A small amount of suitable dispersant or wetting agent (surfactant) can be used for the purpose of promoting dispersion of pigment.

It is preferable to add water to the reaction mixture in the later stage of the contacting of pigment and metal alkoxide in order to promote decomposition of the metal alkoxide. The amount of the added water should not exceed 50 wt. % of the amount of the metal alkoxide. It is also preferable to warm the reaction mixture at the stage of addition of water.

If a small amount of a mineral acid, preferably hydrochloric acid, is added to the reaction mixture, hydrolysis of metal alkoxide is further promoted.

In accordance with the present invention, the hydrolysis of metal alkoxide proceeds very slowly, and therefore a dense and uniform layer of hydrated oxide of the corresponding metal is deposited. In the above mentioned conventional methods, the hydrated metal oxide or metal salt depositing on the surface of pigments tends to partially coagulate to form chains because of rapid reaction and thus the pigment surface is not well coated. In contrast, according to the present invention, the pigment surface is coated densely and uniformly with hydrated metal oxide by slow hydrolysis of metal alkoxide.

If two or more metal alkoxides of different properties are used in combination, pigments can be provided with improved heat resistance, weatherability, light fastness, chemical stability, etc. in combination.

It is noteworthy that cadmium pigments coated with silica in accordance with the process of the present invention are neither discolored nor decolored at a high temperature of $1150°$ C. or higher. Chromium yellows coated with silica by the conventional process discolor at $300°$ C. in 5~10 minutes, but those coated by the process of the present invention do not discolor at $300°$ C. even after 30 minutes.

When chromium yellow, cadmium yellow (pale and light) and titanium dioxide pigments are coated in accordance with the process of the present invention, their resistance to visible light and ultra violet rays is enhanced, and their light fastness and weatherability are also improved.

The coated pigments in accordance with the present invention have excellent heat-resistance, weatherability and chemical stability, and can be suitably used as ceramic pigments, which require heat resistance and chemical stability, and as tinting agents for engineering plastics.

SPECIFIC DESCRIPTION OF EMBODIMENTS

EXAMPLES 1~4

In a solution of a metal alkoxide and a solvent as indicated in Table 1 in an indicated ratio, a pigment indicated in the table in the amount indicated in the table was immersed and the mixture was stirred at $0°$ C. for 10 hours, and thereafter further stirred at room temperature ($20°$ C.) for 20 hours. The thus treated pigment was collected by filtration, and the collected pigment was air-dried at room temperature for 24 hours, further dried at $100°$ C. for 10 hours and at $200°$ C. for 1 hour, and thereafter pulverized. To 100 parts by weight of soft poly(vinyl chloride), 1 part by weight of each of the thus obtained coated pigments and 2 parts by weight of titanium dioxide were added. The mixture was mixed well by means of heated rolls ($120°$ C.), shaped into 1 mm thick plates at $170°$ C. by means of a press, and cut into $30\times 100$ mm test pieces. Time course change in color of the test pieces was checked by immersing some test pieces in water and exposing them outdoors for 3 months and by soaking some test pieces in a 1N HCl solution or 1N NaOH solution for 1 month. The change in color was determined by measuring tristimulus values X, Y and Z in accordance with the method of JIS Z8722, the L,a,b values in accordance with the method of JIS Z8730 and calculating the color difference $\Delta E = \sqrt{(\Delta L)^2 + (\Delta a)^2 + (\Delta b)^2}$ from the value of the untested control test piece.

Further, 0.5 part by weight of the thus obtained lemon yellow, chromium orange and molybdenum red was added to 100 parts by weight of polypropylene, the mixture was kneaded well at $200°$ C., $250°$ C., $280°$ C. and $300°$ C. each for 10 minutes in an injection molding machine, and shaped into 3 mm thick plates, which were cut into $50\times 90$ mm test pieces. The L,a,b values were measured in the same manner as above and the color difference from the value of a test piece which was shaped at $200°$ C. for 10 minutes were obtained. The results are shown in Table 1.

EXAMPLES 5 AND 6

To a solution of a metal alkoxide in a solvent as indicated in Table 1 in an indicated ratio, a pigment indicated in the table in the amount indicated in the table was added and the mixture was mixed for 2 hours and then slowly stirred at $0°$ C. for 5 hours. The used pigment had been soaked in ethanol for more than 2 hours beforehand. The mixture was then stirred at room temperature ($20°$ C.) for 20 hours. Then the pigment was collected by filtration, air-dried at room temperature for 24 hours, and further dried at $100°$ C. for 10 hours and at $200°$ C. for 3 hours. The thus obtained coated pigment was added to a low temperature frit glaze (SK 010~01) and a medium temperature frit glaze (SK 4~6) in an amount of 10 wt. %. The mixture was made into a slurry by addition of a suitable amount of water, and the slurry was ball-milled for 2 hours. The milled slurry was applied on ceramic tiles. After drying, the tiles were kept at 300° C. for 3 hours in an electric oven. Thereafter the tiles were heated to 1100° C. and 1200° C. in 4~5 hours. The tiles were fired for 15~20 minutes at the respective temperatures, and change in color was examined.

EXAMPLE 7

To a solution of zirconium tetraethoxide in methyl alcohol in the ratio as indicated in Table 1, cadmium red pigment in the indicated amount was added. The mixture was stirred at room temperature for 20 hours. The pigment was collected by filtration, air-dried at room temperature, further dried at 100° C. for 10 hours and at 200° C. for 1 hour and pulverized. The thus obtained coated pigment was tested in the same manner as in Example 5 and 6 and change in color was examined. The results are indicated in the table.

EXAMPLES 8~13

A pigment indicated in Table 1 in the amount indicated in the table was soaked in the indicated amount of the indicated solvent for 2 hours. Thereafter, the mixture was chilled to 0° C., and the indicated metal alkoxide in the indicated amount was added to the mixture. The mixture was stirred at 0° C. for 20 hours. Thereafter water and 1N HCl in the indicated amounts were added dropwise. The water and the HCl were mixed with the used solvent in an amount equal to the amount of the water beforehand in order that the water and hydrochloric acid would be easily mixed with the alkoxide solution.

The mixture was further stirred well at 0° C. for 2 hours, kept at 0° C. for 30 hours and finally was left to stand at room temperature for 20 hours. The thus treated pigment was collected by filtration, air-dried at room temperature for 24 hours, further dried at 100° C. for 10 hours and at 200° C. for 1 hour and finally pulverized. The thus obtained coated pigments were tested in the same manner as in Examples 1~4 and change in color was examined. For the titanium oxide pigment, only the weatherability test was carried out and change in color was examined after one year's outdoor exposure test wherein the test pieces were immersed in water. The results are indicated in the table.

EXAMPLE 14

To a solution of ethyl silicate (40%) in ethyl acetate in the ratio as indicated in Table 1, the indicated amount of cadmium red pigment was added, and the mixture was stirred at 0° C. for 20 hours. Water and 1N HCl in the indicated amounts were added to the mixture. The water and the hydrochloric acid were beforehand mixed with the ethyl acetate in an amount equal to the amount of the water so that they could easily mix with the alkoxide mixture.

The mixture was stirred well at 0° C. for 2 hours, kept at that temperature for 30 hours and finally, allowed to stand at room temperature for 20 hours. The thus treated pigment was collected by filtration, air-dried at room temperature for 24 hours, dried at 100° C. for 10 hours and finally at 200° C. for 3 hours. The thus obtained coated pigment was mixed into a low temperature frit glaze (SK 010~01) and a medium temperature frit glaze (SK 4~6), respectively in an amount of 10 wt. %, and made into a slurry by addition of a suitable amount of water. After the mixture was ball-milled for 2 hours, it was applied on ceramic tiles. The tiles were dried well at room temperature and then dried at 300° C. for 3 hours. Thereafter, they were heated to 1100° C. and 1200° C. in 4~5 hours, and they were fired at the respective temperatures for 15~20 minutes. Change in color was examined. The results are indicated in the table.

EXAMPLE 15

Cadmium red pigment in the amount indicated in Table 1 was soaked in the indicated amount of propyl alcohol at room temperature for more than 2 hours with stirring. Then the indicated amount of titanium tetraisopropoxide was added dropwise and the mixture was stirred for 20 hours. Water and 1N HCl which were mixed with propyl alcohol in an amount equal to the amount of the water were added dropwise to the reaction mixture. The reaction mixture was stirred well for 2 hours, and allowed to stand at room temperature for 20 hours and then kept at 60° C. for 1 hour. After cooling to room temperature, the pigment was collected by filtration, air-dried at room temperature for more than 24 hours, and further dried at 100° C. for 10 hours and at 200° C. for 3 hours. The thus obtained coated pigment was tested in the same manner as in Example 15, and change in color was examined. The results are shown in the table.

EXAMPLE 16

Lemon yellow (10G) in the amount indicated in Table 1 was added to a solution of the indicated metal alkoxide and solvent in the indicated ratio and the mixture was stirred at 0° C. for 20 hours. Thereafter, the indicated amounts of water, 1N HCl and the solvent (in an amount equal to the amount of the water) was added to the reaction mixture in the same manner as in Examples 8~13, and the mixture was further stirred at 0° C. for 2 hours, at room temperature for 20 hours and finally at 60° C. for 1 hour. After cooling to room temperature, the pigment was collected by filtration, air-dried at room temperature for more than 24 hours, at 100° C. for 10 hours, finally at 200° C. for 1 hour, and pulverized. The thus obtained coated pigment was tested in the same manner as in Examples 1~4, and change in color was examined. The results are indicated in the table.

EXAMPLE 17

Chromium red in the amount indicated in Table 1 was soaked in the indicated amount of methyl alcohol at room temperature for more than 2 hours. Then ethyl silicate (40% silica) in the indicated amount was added to the mixture, and the resulting mixture was stirred well for 1 hour. A mixture of the indicated amounts of water and 1N HCl and the solvent of an amount equal to the amount of the water was added to the mixture, and the mixture was stirred well for 2 hours. The mixture was allowed to stand at room temperature for 40 hours. Then the pigment was collected by filtration, air-dried at room temperature for 24 hours, dried at 100° C. for 10 hours, finally at 200° C. for 1 hour and pulverized. The thus obtained coated pigment was tested in the same manner as in Examples 1~4, and change in color was examined.

EXAMPLE 18

Cadmium yellow pigment (light) in the amount indicated in Table 1 was added to a mixture of methyl silicate and ethyl alcohol in the indicated ratio at 0° C. and the mixture was stirred for 1 hour. Thereafter, a mixture of the indicated amounts of water and 1N HCl and the solvent of the amount equal to the amount of the water was added to the pigment mixture, and the mixture was stirred at 0° C. for 10 hours at room temperature for 20 hours and finally the mixture was kept at 60° C. for 1 hour. After cooling to room temperature, the pigment was collected by filtration, air-dried at room temperature for 24 hours, dried at 100° C. for 10 hours and at 200° C. for 1 hour and pulverized. The thus obtained coated pigment was tested in the same manner as in Example 4 and change in color was examined. The results are indicated in the table.

EXAMPLES 19 AND 20

Cadmium pigments indicated in Table 1 were respectively soaked in the indicated solvents in the indicated amount with stirring for 2 hours. Then the mixture was chilled to 0° C. To the pigment mixture, the respective indicated metal alkoxide was added, and the resulting mixture was stirred well for 1 hour. Thereafter, the indicated amounts of water and 1N HCl were added and the mixture was stirred well for 2 hours. Then the mixture was kept in a chilling bath for 10 hours with stirring, and thereafter, the mixture was allowed to stand at room temperature for 30 hours. The thus treated pigment was collected by filtration, air-dried at room temperature for more than 24 hours, and dried at 100° C. for 10 hours and at 200° C. for 3 hours. The thus obtained coated pigment was mixed into a low temperature glaze (SK 010~01) and a medium temperature glaze (SK 4~6) in the amount of 10 wt. %, the mixture was made into a slurry by addition of a suitable amount of water and the slurry was ball-milled for 2 hours. The slurry was applied on ceramic tiles, which were dried well at room temperature, and further dried at 300° C. for 3 hours. Then the tiles were heated to 1100° C. and 1200° C. in 4~5 hours and fired at those temperatures for 15~20 minutes, whereafter change in color was examined. The results are indicated in the table.

COMPARATIVE EXAMPLES 1-7

One part by weight of sodium metasilicate was dissolved in 100 parts by weight of water. Ten (10) parts by weight of a pigment indicated in Table 2 was added to the solution, and the mixture was stirred at 40° C. for 2 hours. Then the pH of the mixture was adjusted to 6.5~7.5 by dropwise addition of 1N $H_2SO_4$. Thereafter the mixture was stirred well for 5 hours, and then stirred at room temperature for more than 20 hours. The thus treated pigment was collected by filtration, washed with water, and dried at 100° C. for 3 hours and at 200° C. for 1 hour. The pigments of Comparative Examples 1~3 were tested in the same manner as in Examples 1~3, the pigments of Comparative Examples 4~5 were tested in the same manner as in Example 4, the pigment of Comparative Example 6 was tested in the same manner as in Example 13, and change in color was examined. The results are indicated in the table.

COMPARATIVE EXAMPLES 8 AND 9

Two (2) parts by weight of sodium metasilicate was dissolved in 100 parts by weight of water. Ten (10) parts by weight of the indicated cadmium pigment and 0.3 part by weight of 2-amino-2-methyl-1-propanol were added to the solution and the mixture was mixed well at 40° C. for 2 hours. The pH of the mixture was adjusted to 6.5~7.5 by dropwise addition of 1N $H_2SO_4$. The mixture was mixed well for 5 hours, and further stirred at room temperature for more than 20 hours. The pigment was collected by filtration, and dried at 100° C. for 3 hours and at 200° C. for 1 hour. The thus obtained pigment was mixed into frit glazes and made into a slurry by addition of a suitable amount of water, and the slurry was applied on ceramic tiles and fired in the same manner as in Examples 19 and 20.

In the above-described Examples and Comparative Examples, color change at elevated temperatures of cadmium pigments was examined. With respect to the low temperature glazes (900°~1100° C.), the pigments of Comparative Examples which were coated by the conventional precipitation method were partly discolored or decolored in the temperature range of up to 1000° C., but the pigments coated in accordance with the present invention did not undergo color change. With respect to the intermediate temperature glazes (1100°~1200° C.), the coated pigments of Comparative Examples darkened and remarkably decolored. In contrast the coated pigments of the present invention underwent little discoloration and retained their brilliant tint. In the higher temperature range up to 1200° C., the difference between the coated pigments of the present invention and those of Comparative Examples was far more remarkable. It was confirmed that the coated pigments of the present invention have excellent hea resistance and chemical stability.

TABLE 1

| Example No. | parts by weight | | | | | | | | | |
|---|---|---|---|---|---|---|---|---|---|---|
| | 1 | 2 | 3 | 4 | 5 | 6 | 7 | 8 | 9 | 10 |
| Ethyl silicate 28 | 10 | | | | | | | | | 5 |
| Ethyl silicate 40 | | 25 | | | | | | 25 | | |
| Methyl silicate | | | 0.25 | | | | | | 10 | |
| Zirconium tetraethoxide | | | | | 25 | | | | | |
| Zirconium tetrabutoxide | | | | 10 | | | | 3 | | |
| Titanium tetraisopropoxide | | | | | | | | | | |
| Titanium tetrapropoxide | | | | | | 40 | | | | |
| Aluminum triethoxide | | | | | | | | | | 5 |
| Boron triethoxide | | | | | | | | | | |
| Methyl alcohol | 90 | | | | | | 75 | | | |
| Ethyl alcohol | | 75 | | 90 | | | | | 97 | |
| Propyl alcohol | | | 99.75 | | | | | | | 90 |
| Acetyl acetone | | | | | | | | | | |
| Ethyl acetate | | | | | 75 | | | | | |
| Ethylene glycol | | | | | | 60 | | | 90 | |
| Water | 0 | 0 | 0 | 0 | 0 | 0 | 0 | 0.2 | 1.3 | 1.3 |
| 1N HCl | 0 | 0 | 0 | 0 | 0 | 0 | 0 | 0.1 | 0.4 | 0.4 |
| Lemon yellow (10 G) | 100 | | | | | | | 100 | | |
| Chromium orange (10 R) | | 100 | | | | | | | 100 | |

TABLE 1-continued

| | | | | | | | | | | |
|---|---|---|---|---|---|---|---|---|---|---|
| Molybdenum red | | 100 | | | | | | | | 100 |
| Cadmium yellow (light) | | | 100 | | | | | | | |
| Cadmium yellow | | | | 100 | | | | | | |
| Cadmium red | | | | | 100 | 100 | | | | |
| Ultramarine | | | | | | | | | | |
| Titanium oxide | | | | | | | | | | |
| Weatherability *1 | | ◉ | ◉ | O | O | — | — | — | ◉ | ◉ | O |
| Acid resistance *1 | | ◉ | O | O | O | — | — | — | ◉ | O | O |
| Alkali resistance *1 | | O | ◉ | O | ◉ | — | — | — | O | ◉ | ◉ |
| Heat resistance 250° C. *1 | | ◉ | ◉ | O | — | — | — | — | ◉ | O | O |
| Heat resistance 300° C. *1 | | O | O | O | — | — | — | — | O | O | O |
| Heat resistance 1100° C. *2 | | — | — | — | — | ◉ | ◉ | ◉ | — | — | — |
| Heat resistance 1200° C. *2 | | — | — | — | — | O | O | O | — | — | — | parts by weight

| Example No. | 11 | 12 | 13 | 14 | 15 | 16 | 17 | 18 | 19 | 20 |
|---|---|---|---|---|---|---|---|---|---|---|
| Ethyl silicate 28 | 8 | | | | | 10 | | | 40 | |
| Ethyl silicate 40 | | 10 | | 0.25 | | | 10 | | | |
| Methyl silicate | | | | | | | | 10 | | |
| Zirconium tetraethoxide | | | 10 | | | | | | | |
| Zirconium tetrabutoxide | | | | | | | | | | 20 |
| Titanium tetraisopropoxide | | | | | 25 | | | | | |
| Titanium tetrapropoxide | | | | | | | | | | |
| Aluminum triethoxide | | | | | | | | | | |
| Boron triethoxide | 2 | | | | | | | | | |
| Methyl alcohol | | | | | | | 90 | | | |
| Ethyl alcohol | 90 | 90 | | | | 90 | | 90 | | 80 |
| Propyl alcohol | | | 90 | | 75 | | | | 60 | |
| Acetyl acetone | | | | | | | | | | |
| Ethyl acetate | | | | 99.75 | | | | | | |
| Ethylene glycol | | | | | | | | | | |
| Water | 1.7 | 1.3 | 0.9 | 0.3 | 2.3 | 1.3 | 1.3 | 1.3 | 5.2 | 1.4 |
| 1N HCl | 0 | 0.4 | 0.2 | 0.1 | 0.5 | 0.4 | 0.4 | 0.4 | 1.6 | 0.7 |
| Lemon yellow (10 G) | | | | | | 100 | | | | |
| Chromium orange (10 R) | | | | | | | 100 | | | |
| Molybdenum red | | | | | | | | | | |
| Cadmium yellow (light) | 100 | | | | | | | 100 | | |
| Cadmium yellow | | | | | | | | | 100 | |
| Cadmium red | | | | | 100 | 100 | | | | 100 |
| Ultramarine | | 100 | | | | | | | | |
| Titanium oxide | | | 100 | | | | | | | |
| Weatherability *1 | O | ◉ | ◉ | — | — | | ◉ | O | — | — |
| Acid resistance *1 | O | O | — | — | — | | ◉ | O | — | — |
| Alkali resistance *1 | ◉ | ◉ | — | — | — | O | ◉ | ◉ | — | — |
| Heat resistance 250° C. *1 | — | — | — | — | — | ◉ | ◉ | O | — | — |
| Heat resistance 300° C. *1 | — | — | — | — | — | O | O | — | — | — |
| Heat resistance 1100° C. *2 | — | — | — | O~◉ | ◉ | — | — | — | ◉ | ◉ |
| Heat resistance 1200° C. *2 | — | — | — | Δ~O | O | — | — | — | O | O~◉ |

Legend
*1 ◉: ΔE = 0~0.5; O: ΔE = 0.5~1.0; Δ: ΔE = 1.0~2.0; X: ΔE = >2.0
*2 ◉: No discoloration and no decoloration; O: Partly discolored; Δ: Discoloration and decoloration
X: Pronounced discoloration and decoloration

TABLE 2

| Comparative Example No. | 1 | 2 | 3 | 4 | 5 | 6 | 7 | 8 | 9 |
|---|---|---|---|---|---|---|---|---|---|
| Lemon yellow (10 G) | * | | | | | | | | |
| Chromium orange (10 R) | | * | | | | | | | |
| Molybdenum red | | | * | | | | | | |
| Cadmium yellow (light) | | | | * | | | | | |
| Ultramarine | | | | | * | | | | |
| Titanium oxide | | | | | | * | | | |
| Cadmium yellow | | | | | | | | * | * |
| Cadmium red | | | | | | | * | | |
| Weatherability *1 | O | O | Δ | Δ | O | O | — | — | — |
| Acid resistance *1 | O | Δ | Δ | Δ | Δ | — | — | — | — |
| Alkali resistance *1 | Δ | O | O | O | O | — | — | — | — |
| Heat resistance 250° C. *1 | Δ | Δ | Δ | — | — | — | — | — | — |
| Heat resistance 300° C. *1 | X | X | X | — | — | — | — | — | — |
| Heat resistance 1100° C. *2 | — | — | — | — | — | — | Δ~O | Δ~O | O |
| Heat resistance 1200° C. *2 | — | — | — | — | — | — | X | X | X |

Legend
*1 ◉: ΔE = 0~0.5 O: ΔE = 0.5~1.0 Δ: ΔE = 1.0~2.0 X: ΔE = >2.0
*2 ◉: No discoloration and decoloration O: Partly discolored Δ: Discoloration and decoloration X: Pronounced discoloration and decoloration

We claim:

1. A process for preparing a coated cadmium-based pigment having acid-, alkali, and heat-resistance, consisting essentially of:
   (a) contacting a hydrophilic cadmium-based pigment with a metal alkoxide selected from the group consisting of an alkoxide of titanium, silicon, zirconium, zinc and boron in an organic solvent which is at least partially water-miscible; and
   (b) drying or firing or drying and firing said coated pigment.

2. The process for preparing the coated cadmium-based pigment as described in claim 1, wherein water is added to the mixture of the pigment, the metal alkoxide and the organic solvent at the later stage of the contacting.

3. The process for preparing the coated cadmium-based pigment as described in claim 2, wherein a mineral acid is added to the mixture in addition to water.

4. The process for preparing the coated cadmium-based pigment as described in claim 1, wherein the pigment is soaked in the solvent for not less than 2 hours prior to contacting with the metal alkoxide.

5. The process for preparing the coated cadmium-based pigment as described in claim 1, wherein the contacting of the pigment and the metal alkoxide in the solvent is conducted at a temperature of $-10°$ C.$\sim 10°$ C., and the reaction mixture is warmed to a temperature up to 80° C.

6. The process for preparing the coated cadmium-based pigment as described in claim 1, wherein the metal alkoxide issued in an amount of 0.1 wt. % of the pigment to be treated as the metal oxide.

7. The process for preparing the coated cadmium-based pigment as described in claim 1, wherein said metal alkoxide is a methoxide, ethoxide, n-propoxide, isopropoxide and butoxide of titanium, silicon, zirconium, zinc, boron, thorium, beryllium, barium, tin and a rare earth metal.

8. The process for preparing the coated cadmium-based pigment as described in claim 7, wherein said metal alkoxide is selected from the group consisting of silicon tetramethoxide, silicon tetraethoxide, zirconium tetraethoxide, zirconium tetrabutoxide, titanum tetra-n-propoxide, titanium tetraisopropoxide, and boron triethoxide.

9. The process for preparing the coated cadmium-based pigment as described in claim 1, wherein said organic solvent is selected from the group consisting of methyl alcohol, ethyl alcohol, propyl alcohol, acetone, acetylacetane, ethylene glycol, butyl alcohol, methyl acetate, ethyl acetate, methyl ketone and methyl isobutyl ketone and mixtures thereof.

10. The process for preparing the coated cadmium-based pigment as described in claim 6, wherein said metal alkoxide is used in an amount of 0.1 to about 10 wt. %.

11. The process for preparing the coated cadmium-based pigment as described in claim 1, wherein said cadmium pigment is cadmium red, cadmium yellow or cadmium yellow (light).

* * * * *